(12) United States Patent
Bhatti (10) Patent No.: US 8,084,905 B2
(45) Date of Patent: Dec. 27, 2011

(54) BEARING FOR AN ELECTRIC ACTUATOR MOTOR

(75) Inventor: Irfan A Bhatti, Farmington Hills, MI (US)

(73) Assignee: Robert Bosch GmbH, Stuttgart (DE)

(*) Notice: Subject to any disclaimer, the term of this patent is extended or adjusted under 35 U.S.C. 154(b) by 227 days.

(21) Appl. No.: 12/074,973

(22) Filed: Mar. 7, 2008

(65) Prior Publication Data
US 2009/0224618 A1 Sep. 10, 2009

(51) Int. Cl.
*H02K 5/16* (2006.01)
(52) U.S. Cl. .............. 310/90; 384/276; 384/296
(58) Field of Classification Search .......... 310/90; 384/243, 275, 276, 295–297, 299, 300, 420, 384/425
See application file for complete search history.

(56) References Cited

U.S. PATENT DOCUMENTS

| | | | |
|---|---|---|---|
| 3,774,981 A | 11/1973 | Kuck | |
| 3,794,869 A | 2/1974 | Apostoleris | |
| 3,836,214 A | 9/1974 | Gengard et al. | |
| 4,616,940 A | 10/1986 | DeBruyn | |
| 5,273,369 A * | 12/1993 | Strobl | 384/206 |
| 5,399,025 A * | 3/1995 | Higuchi et al. | 384/428 |
| 5,440,186 A | 8/1995 | Forsell et al. | |
| 5,517,070 A * | 5/1996 | Schmidt | 310/89 |
| 5,644,180 A | 7/1997 | Buchanan, Jr. | |
| 5,811,903 A | 9/1998 | Ueno et al. | |
| 6,208,046 B1 | 3/2001 | Lee | |
| 6,698,933 B2 | 3/2004 | Lau | |
| 6,867,516 B2 | 3/2005 | Frey et al. | |
| 6,965,180 B2 * | 11/2005 | Oh et al. | 310/90 |
| 2004/0164631 A1 | 8/2004 | Suzuki et al. | |
| 2005/0265641 A1 | 12/2005 | Shishido et al. | |
| 2007/0013248 A1 * | 1/2007 | Viernekes et al. | 310/90 |

FOREIGN PATENT DOCUMENTS

| EP | 0 868 009 A1 | 9/1998 |
|---|---|---|
| EP | 1 744 436 A | 1/2007 |

OTHER PUBLICATIONS

Invitation and Search Report for corresponding PCT/US2009/001481 issued by the European Patent Office on Sep. 17, 2009.

* cited by examiner

*Primary Examiner* — Quyen Leung
*Assistant Examiner* — David W. Scheuermann
(74) *Attorney, Agent, or Firm* — Baker & Daniels LLP (57) ABSTRACT

An improved bearing for an electric motor includes a body portion having an open end configured to receive a portion of an armature shaft of an electric motor therein. In an illustrated embodiment, the bearing also includes a base configured to apply a spring force to an end surface of the armature shaft, and a connecting portion located between the body portion and the base.

36 Claims, 6 Drawing Sheets

BEARING FOR AN ELECTRIC ACTUATOR MOTOR

FIELD OF THE INVENTION

The present invention relates generally to electric motors. More particularly, the present invention relates to an improved bearing for supporting an armature shaft located in a pole housing of an electric motor.

BACKGROUND AND SUMMARY OF THE INVENTION

Electrical motors, such as actuator motors used in automotive applications, include a rotor and a stator. Such electric motors typically include a metal pole housing configured to receive magnets (stator) and a movable armature (rotor). Plastic pole housings with metal sleeve inserts may also be used. Pole housings are used to maintain a magnetic circuit of the electric motor in a closed field or loop manner. The motor operates by having the armature turn inside the pole housing when a voltage is supplied to the motor. Metal pole housings are produced using a variety of different manufacturing processes. For example, the pole housings may be formed by a deep drawn stamping process, a rolling process, an extrusion process, or other suitable forming process.

When an electric motor is energized, the armature rotates because wires on the armature are arranged relative to the magnetic field so that torque is developed about an axis of rotation of the armature. The armature includes a shaft having a first portion which extends into a nose of the pole housing. The armature shaft also includes a second portion which extends into a gear box. In order to support the rotating armature, first and second bushings are typically used on the first and second portions, respectively, of the armature shaft.

In certain applications, such as a window lift motor application, for example, cylindrical or sleeve bushings are used in the nose of the pole housing and spherical bearings are used in the brush card to support the armature shaft. Typically, these bushings are made from a sintered iron-based material. These sintered bushings are usually impregnated with grease or oil to provide low friction contact with the armature shaft during rotation of the armature.

The first bushing is press fit into a nose of the pole housing to support radial loads from the armature under static or dynamic conditions. In order to support an axial load on the armature in conventional motors, a reinforced plastic end plug or thrust button is typically coupled to an end of the armature shaft. This thrust button is used to reduce the thumping or rubbing noises during motor operation by avoiding asperity (metal-to-metal) contact between the metal armature shaft and metal pole housing in an axial direction. Therefore, the cost of electric motors is increased due to the need to provide multiple separate components for supporting the armature (rotor) in the pole housing and the associated inventory and assembly costs for these multiple components. These multiple components include sintered bushings, a thrust button coupled to an end of the armature shaft, a broached end of the armature shaft to receive the thrust button, grease or oil for the bushings, and retainers for the bushings.

The present invention reduces the required components substantially by using a polymeric bearing having an integral, flexible end portion to provide multi-axis dynamic load support for the armature shaft within the pole housing. The improved bearing of the present invention is a cup-shaped bearing having a cylindrical body portion with a rigid wall for supporting a side wall of an armature shaft of the electric motor. The rigid wall of the body portion of the bearing supports radial dynamic loads on the armature shaft. The improved bearing also includes a flexible end or base formed integrally with cylindrical body portion. The base supports axial dynamic loads on the armature shaft. The flexible base has a predetermined spring constant to maintain a preload condition on the armature shaft, thereby reducing movement of the armature shaft during operation of the motor.

In an illustrated embodiment, at least an inner surface of the bearing which contacts the armature shaft is coated with a PTFE polymeric material having a low coefficient of friction and high self-lubricating characteristics. The improved bearing of the present invention eliminates the need to use sintered bearings, separate thrust buttons coupled to the end of the armature shaft to absorb axial loads, a broached end of the armature shaft to receive the thrust button, grease or oil on the bearings, or retainer clips for the bearings.

In one illustrated embodiment of the present invention, a bearing is provided for an electric motor. The bearing comprises a body portion having an open end configured to receive a portion of an armature shaft of an electric motor therein, a base configured to apply a spring force to an end of the armature shaft, and a connecting portion located between the body portion and the base. The connecting portion is configured to provide a predetermined spring constant for the spring force applied by the base.

In one illustrated embodiment, the body portion, the base and the connecting portion are integrally formed as a one-piece bearing. Also in an illustrated embodiment, the body portion further comprises means for retaining the body portion in a housing of the electric motor.

In another illustrated embodiment of the present invention, a bearing for an electric motor comprises a body portion having an open end configured to receive a portion of an armature shaft of an electric motor therein. The body portion is configured to support radial loads on the armature shaft in a direction normal to a longitudinal axis of the armature shaft. The bearing also comprises means formed integrally with the body portion for applying a force to the armature shaft in an axial direction generally parallel to the longitudinal axis of the armature shaft.

In yet another illustrated embodiment of the present invention, a bearing for an electric motor comprises a generally cylindrical body portion configured to receive and surround a portion of an armature shaft of an electric motor. The body portion has an inner surface and an outer surface. The inner surface is configured to engage the armature shaft to support radial loads on the armature shaft in a direction normal to a longitudinal axis of the armature shaft. The bearing also comprises means formed integrally with the body portion for retaining the body portion in a housing of the electric motor. The retaining means extends radially outwardly beyond the outer surface of the body portion.

In a further illustrated embodiment of the present invention, an electric motor comprises a housing including a body portion having a nose and an open end opposite from the nose. The open end of the housing provides access to an interior region of the housing. The motor also comprises a magnet structure located in the interior region of the housing, and an armature located in the interior region of the housing. The armature includes an armature shaft having a portion located in the nose of the housing. The armature and armature shaft are rotatable relative to the magnet structure. The electric motor further comprises a bearing located in the nose of the housing. The bearing includes a body portion having an open end configured to receive a portion of the armature shaft and a base formed integrally with the body portion. The base is configured to apply a spring force to an end of the armature shaft in an axial direction generally parallel to the longitudinal axis of the armature shaft.

Additional features of the present invention will become apparent to those skilled in the art upon consideration of the following detailed description of illustrative embodiments exemplifying the best mode of carrying out the invention as presently perceived.

BRIEF DESCRIPTION OF THE DRAWINGS

The above-mentioned and other features of this invention, and the manner of attaining them, will become more apparent and the invention itself will be better understood by reference to the following description of illustrated embodiments of the invention taken in conjunction with the accompanying drawings, wherein.

DETAILED DESCRIPTION OF THE DRAWINGS

Before embodiments of the invention are explained in detail, it is to be understood that the invention is not limited in its application to the details of the examples set forth in the following description or illustrated in the drawings. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. The terms "connected" and "coupled" are used broadly and encompass both direct and indirect mounting, connecting, and coupling.

Figure 1:
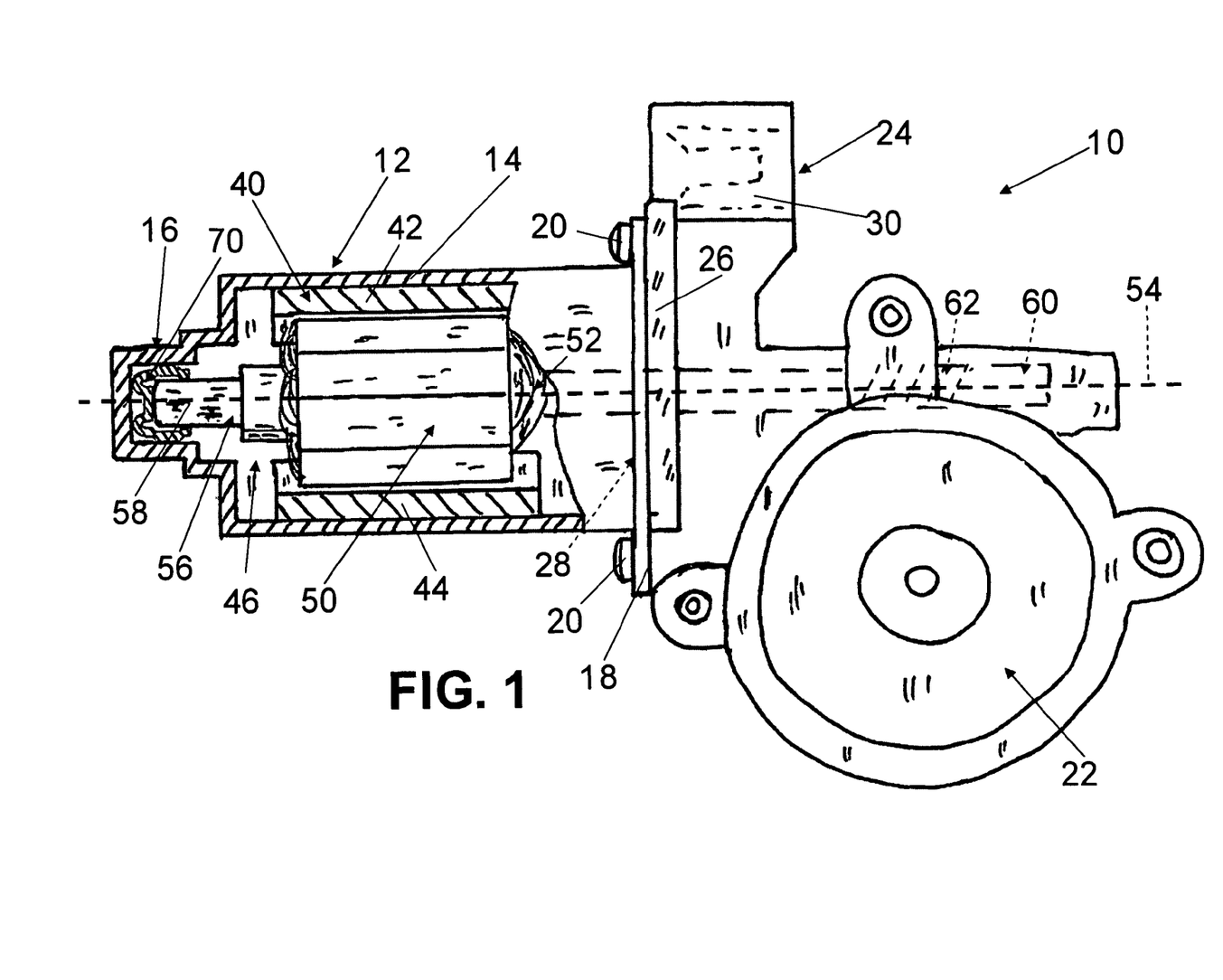
FIG. 1 is a side elevational view, with portions shown in a cut-away cross section, of an electric motor including a pole housing having an improved bearing of the present invention located therein, a rotatable armature, a brush card assembly, and a gear housing.

Referring now to the drawings, FIG. 1 illustrates an electric motor 10 having a pole housing 12. The pole housing 12 includes a body portion 14 having a nose 16 and an attachment flange 18. The attachment flange includes a plurality of apertures configured to receive fasteners 20 to couple the pole housing 12 to a structural support such as, for example, a gear housing 22 located within a vehicle or other location. A brush card assembly 24 is located between the pole housing 12 and the gear housing 22. Brush card assembly 24 illustratively includes a rubber gasket or other seal 26 over-molded onto an interface portion of the brush card 24. Over-molded gasket 26 provides a seal between an open end 28 of pole housing 12 and the gear housing 22. Brush card assembly 24 also includes an electrical connector 30 which interfaces with a mating connector of a wire harness (not shown) that provides power, ground and other control connections to the electric motor 10.

Pole having 12 is typically made from a metal material as discussed above. It is understood, however, that the pole housing 12 may be made from other suitable materials, such as plastic. When plastic is used for the pole housing 12, a metal sleeve or flux ring is located in the plastic housing.

Electric motor 10 includes a stator 40 provided by a magnet structure including first and second permanent magnets 42 and 44 located within an interior region 46 of pole housing 12. Magnets 42 and 44 are illustratively held in position using spring clips (not shown) in a conventional manner. It is understood that other magnet structures may be used for the stator 40, if desired.

A rotor or armature 50 is also located within the interior region 46 of pole housing 12 between the magnets 42 and 44. Illustratively, armature 50 includes wire windings 52. When the wire windings are energized, armature 50 rotates about a longitudinal axis 54 defined by an armature shaft 56. Armature shaft 56 includes a first portion 58 extending into the nose 16 of pole housing 12. Armature shaft 56 further includes a second portion 60 which extends through open end 28 of pole housing 12, through brush card assembly 24 and into the gear housing 22. Illustratively, the second portion 60 of armature shaft 56 includes helical threads 62 which engage and rotate a gear within gear housing 22 in a conventional manner.

As discussed above, conventional electric motors typically use sintered iron-based bushings to support the first portion 58 of armature shaft 56 within the nose 16 of pole housing 12. Conventional motors also use an end plug or thrust button coupled to an end surface 64 of armature shaft 56. Such thrust buttons are typically mushroom-shaped and include a stem which extends into a broached hole formed in the first portion 58 of armature shaft 56. Conventional bushings typically require grease or oil in order to provide low friction contact with the armature shaft 56 during rotation of the armature 50. The present invention illustratively eliminates the requirement for sintered bushings, thrust buttons coupled to the armature shaft, grease or oil to lubricate the bushing, and separate retainer clips used to hold the bushings in place within the nose 16 of the pole housing 12.

Figure 2:
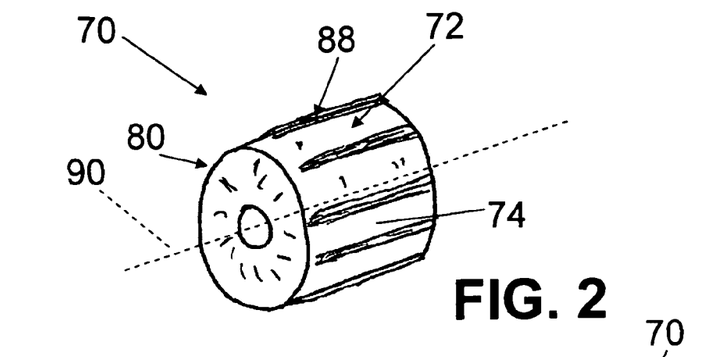
FIG. 2 is a perspective view of one embodiment of the improved bearing used to support an end of an armature shaft within the pole housing.
Figure 3:
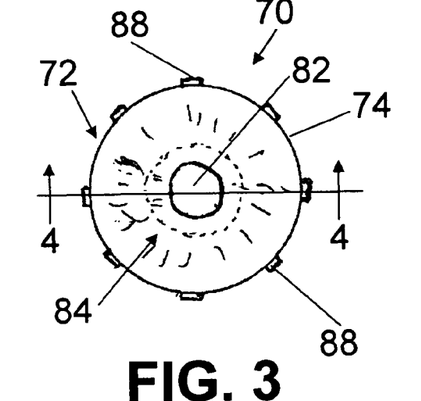
FIG. 3 is an end view of the bearing of FIG. 2.
Figure 4:
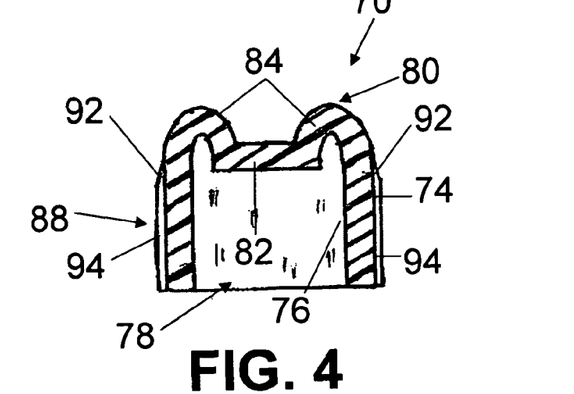
FIG. 4 is a sectional view taken along lines 4-4 of FIG. 3.
Figure 7:
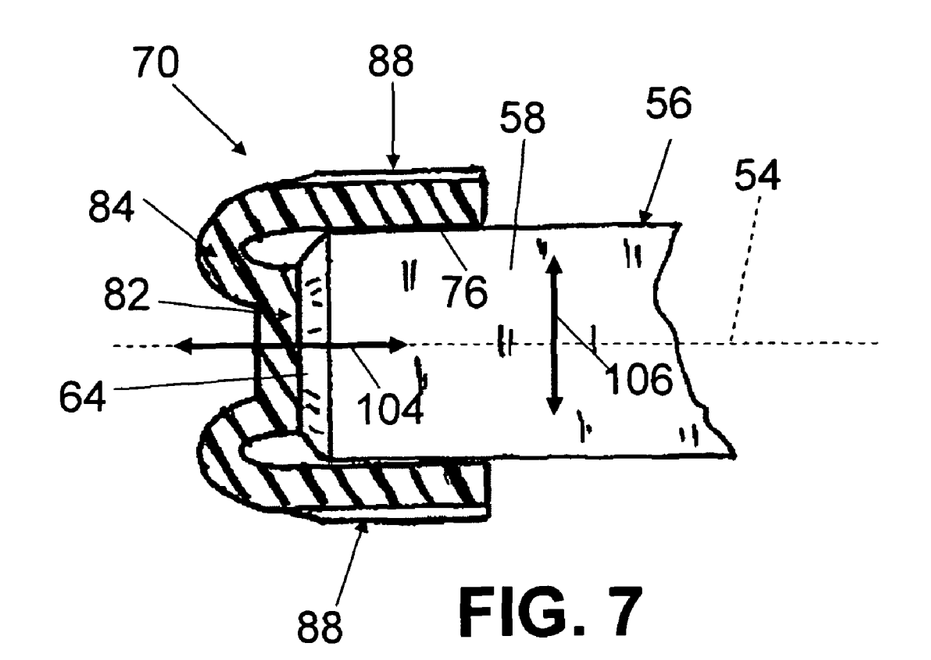
FIG. 7 is an enlarged view illustrating an armature shaft located within the bearing of FIGS. 2-4.

A first embodiment of an improved bearing 70 of the present invention is illustrated in FIGS. 2-4 and 7. Bearing 70 includes a cylindrical body portion 72. Body portion 72 includes an outer surface 74 and an inner surface 76. Bearing 70 includes a first open end 78 configured to receive first portion 58 of armature shaft 56 as best shown in FIG. 7. A second end 80 of bearing 70 is configured to provide a flexible base 82 which engages the end surface 64 of armature shaft 56 as discussed below. In the illustrated embodiment, base 82 is formed by an inwardly curved end portion 84 of bearing 70 as best shown in FIG. 4. In other words, curved end portion 84 of bearing 70 connects the cylindrical body portion 72 to the base 82.

In one embodiment, the end portion 84 of bearing 70 is closed. In another embodiment, the end portion 84 may be formed to include a plurality of openings to provide a web between body portion 72 and base 82. End portion 84 is selectively configured to adjust a spring force applied by base 82 in order to provide a desired spring force against the end surface 64 of armature shaft 56. In other words, the configuration, thickness, number of openings, and shape of end portion 84 is selected to adjust a spring force applied by base 82 to the armature shaft 56. The spring constant is selected to absorb axial loads on the armature shaft 56 and to maintain optimum compression on the armature shaft 56 to reduce rubbing and thumping noises during operation of the electric motor 10 or from external system vibration sources.

The bearing 70 of FIGS. 2-4 also includes a plurality of crush ribs 88 extending along the outer surface 74 of body portion 70. In the illustrated embodiment, crush ribs 88 extend in a direction generally parallel to longitudinal axis 90 of bearing 70. Crush ribs 88 illustratively include a lead-in ramp portion 92 and a body portion 94. It is understood that the crush ribs 88 may extend around the outer surface 74 of body portion of bearing 70 in radial directions. In other embodiments, different shaped members can be formed on outer surface 74, if desired, instead of the crush ribs 88. The crush ribs 88 provide optimum clearance between the bearing 70 and an inner wall of nose 16 of pole housing 12. Due to variations in the manufacturing process, the diameter of the nose 16 of pole housing 12 may vary slightly from design tolerances or nose 16 may be slightly out of round. The crush ribs 88 may be deformed when the bearing 70 is inserted into the nose 16 of pole housing 12. Crush ribs 88 provides an interference fit with the nose 16 to eliminate the need for separate retainer clips to hold the bearing 70 in the nose 16.

Figure 5:
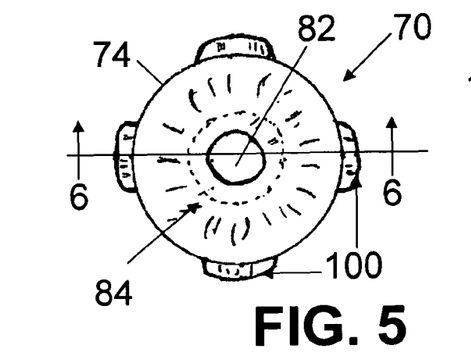
FIG. 5 is an end view of another embodiment of a bearing of the present invention.
Figure 6:
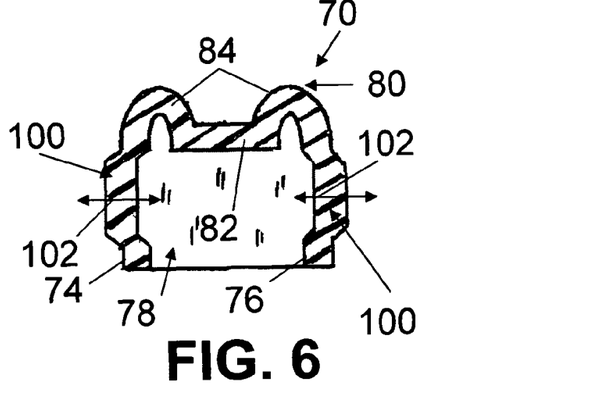
FIG. 6 is a sectional view taken along lines 6-6 of FIG. 5.
Figure 8:
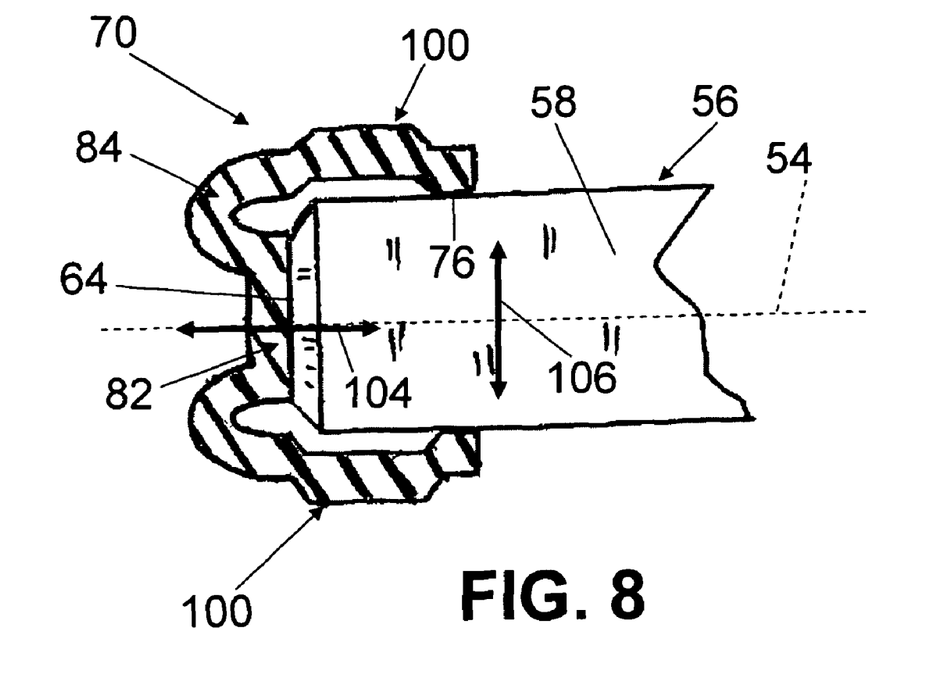
FIG. 8 is an enlarged view illustrating the armature shaft located within the bearing of FIGS. 5 and 6.

Another embodiment of the present invention is illustrated in FIGS. 5, 6 and 8. Reference numbers in FIGS. 5 and 6 that are the same as FIGS. 2-4 indicate elements which perform the same or similar function. In FIGS. 5 and 6, bearing 70 is formed to include a plurality of outwardly extending spring lobes 100 instead of crush ribs 88. Lobes 100 illustratively extend outwardly beyond the outer surface 74 of body portion 72. The lobes 100 provide radial spring forces in the direction of double headed arrows 102 in FIG. 6. Therefore, lobes 100 engage the inner wall of nose 16 as bearing 70 is inserted into the nose 16 of pole housing 12 to retain the bearing 70 in the nose 16 without the use of separate retainer clips.

FIGS. 7 and 8 illustrate operation of the bearings 70 of the present invention in more detail. As discussed above, a spring constant of base 82 may be adjusted so that the base 82 applies a desired spring force against the end surface 64 of armature shaft 56 in an axial direction generally parallel to longitudinal axis 54 as illustrated by double headed arrows 104 in FIGS. 7 and 8. Therefore, engagement of the end 64 of armature shaft 56 with base 82 of bearing 70 establishes optimum compression of the armature shaft 56 within the pole housing 12. The base 82 of bearing 70 absorbs axial loads directed along the longitudinal axis of 54 of armature shaft 56 during operation of the electric motor 10. The base 82 applies a spring force to armature shaft 56 to return the shaft to its normal position after the load is absorbed by the spring force of bearing 70. This provides impact loading for the armature shaft 56 within the pole housing 12.

As also shown in FIGS. 7 and 8, an outer surface of armature shaft 56 engages inner surface 76 of bearing 70. In the embodiment of FIG. 7, crush ribs 88 may be deformed to absorb radial forces on armature shaft 56 in a direction normal to longitudinal axis 54 as illustrated by double headed arrow 106. In the embodiment of FIG. 8, lobes 100 apply a spring force between the inner surface of nose 16 and the outer surface of armature shaft 56 to absorb radially directed forces on the armature shaft 56 in the direction of double headed arrow 106.

As discussed above, the bearing 70 is illustratively made from a polymeric material having a low coefficient of friction and self-lubricating qualities. For example, bearing 70 may be made from or coated with a PTFE polymeric material. As discussed above, the improved bearing 70 of the present invention replaces a sintered bushing, a mushroom-shaped thrust button coupled to a broached end of the armature shaft, grease and oil required to lubricate the bushing, and retainer clips for the bushing. The improved bearing 70 of the present invention therefore reduces component costs and also reduces assembly and inventory costs.

The crush ribs 88 and/or spring lobes 100 reduce the need for readjustment due to armature end play. As discussed above, the crush ribs 88 or lobes 100 are deformable so that bearing 70 can accommodate some misalignment between the armature shaft 56 and nose 16 without binding.

The bearing 70 improves sound damping and performance characteristics of the electric motor 10. The weight of the electric motor 10 may also be reduced. The characteristics of the bearing 70, such as the position or configuration of crush ribs 88, spring lobes 100 or other structure or outer surface 74 of body portion 72 may be adjusted depending upon design requirements. In addition, it is understood that the spring constant applied by base 82 to the end 64 of armature shaft 56 may be optimized depending upon the specific application of the electric motor 10.

The cup-shaped bearing 70 is illustrated as an integrally formed, one-piece bearing. In other embodiments, the bearing may include separate body and base portions coupled together to form the bearing.

Figure 9:
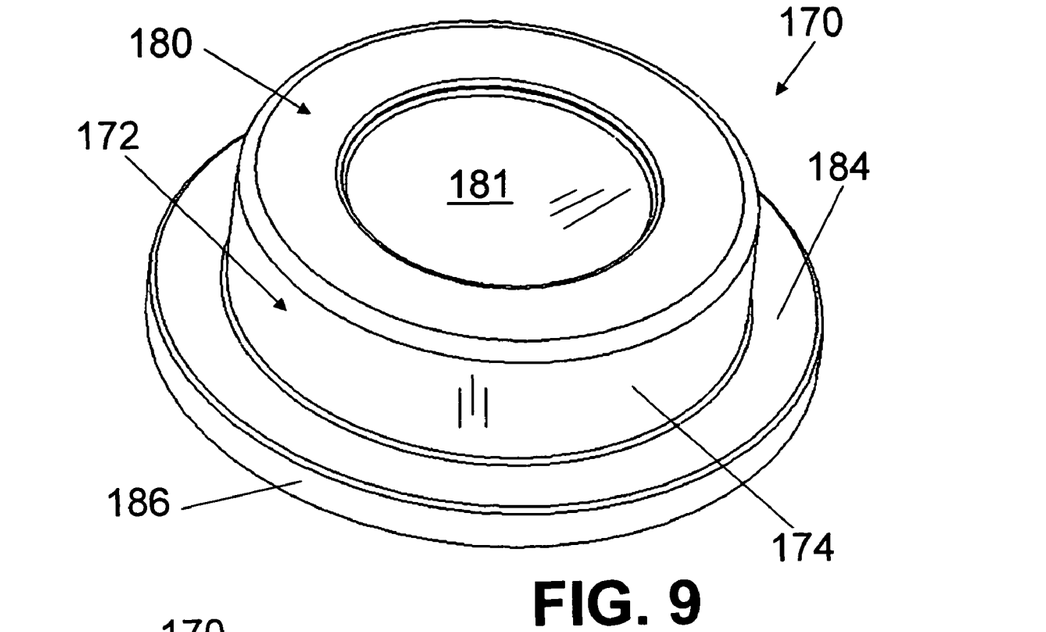
FIG. 9 is a perspective view of yet another embodiment of a bearing of the present invention.
Figure 10:
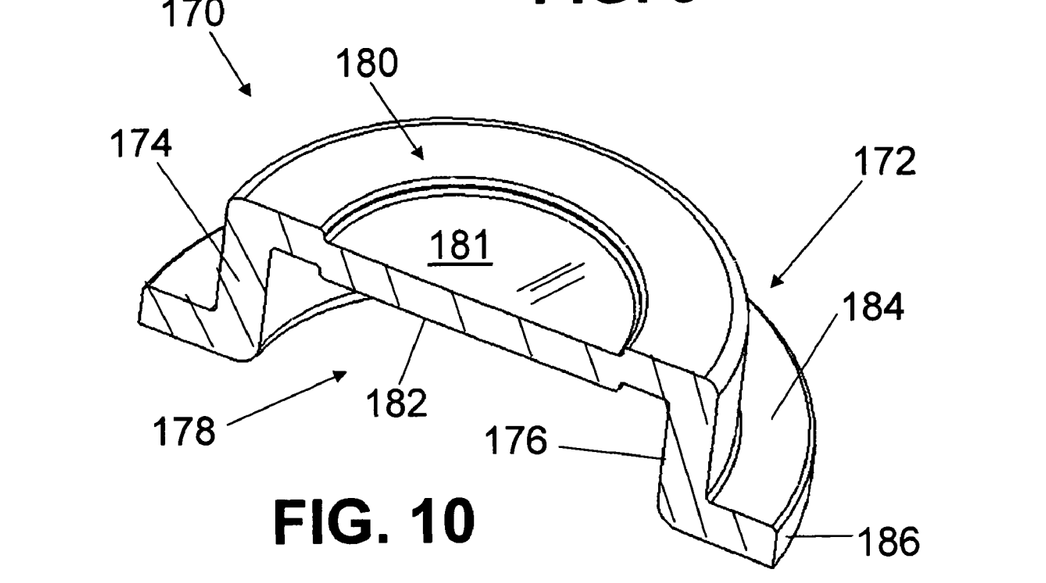
FIG. 10 is a sectional view taken through the bearing of FIG. 9.
Figure 11:
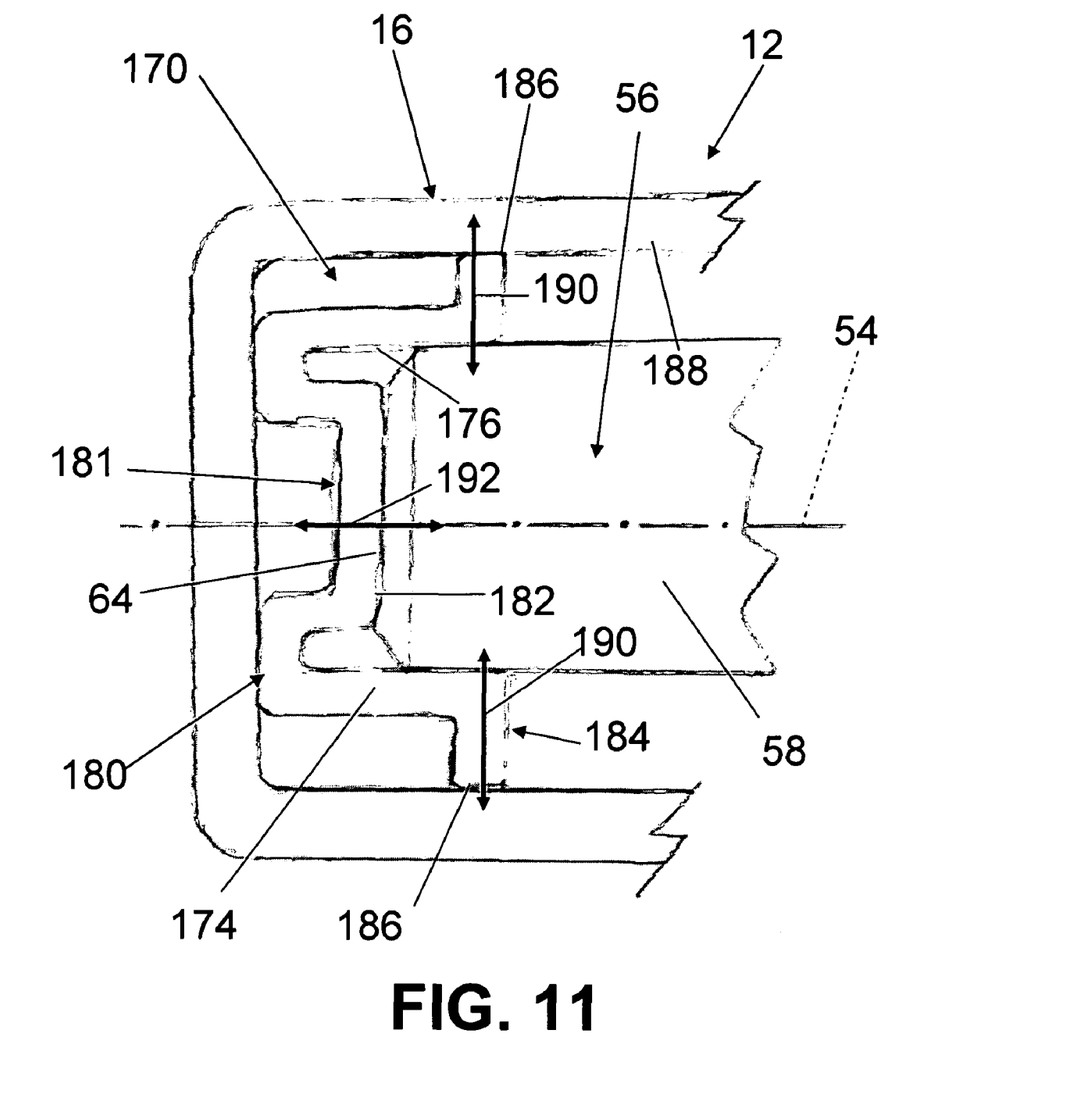
FIG. 11 is a sectional view illustrating the bearing of FIGS. 9 and 10 located in a nose of a pole housing with an armature shaft located in the bearing.

Another embodiment of a bearing for use in a pole housing 12 of an electric motor 10 is illustrated in FIGS. 9-11. The bearing 170 includes a generally cylindrical body portion 172. Body portion 172 includes an outer surface 174 and an inner surface 176 configured to support the end portion 58 of armature shaft 56 as best shown in FIG. 11. An end portion 180 of bearing 170 includes a recessed section 181 configured to define a base 182 spaced apart from an open end 178 of bearing 170. Bearing 170 also includes an outer flange 184 extending radially outwardly away from the generally cylindrical body portion 172. Flange 184 includes an outer surface 186 configured to engage an inner surface 188 of the nose 16 of pole housing 12 when the bearing 170 is inserted into the nose 16.

As illustrated in FIG. 11, the flange 184 provides a spring force against the inner surface 188 of nose 16 as illustrated by double headed arrows 190. This spring force provides an interference fit between bearing 170 and nose 16 to hold the bearing 170 in place within the nose 16 without the use of retainer clips. Inner surface 176 of bearing 170 supports end portion 58 of armature shaft 56 in a radial direction. In other words, inner surface 176 of bearing 170 supports radial loads on the armature shaft 56 in a direction normal to the longitudinal axis 54 of armature shaft 56. Bearing 170 is deformable so that bearing 170 is self adjusting and can accommodate some misalignment between the armature shaft 56 and nose 16 without binding similar to the adjustability features of spherical bearings.

Base 182 is configured to engage an end surface 64 of armature shaft 56. The end portion 180 and recessed section 181 of bearing 170 are configured to establish a pre-determined spring constant for base 182 as discussed above. Therefore, the base 182 applies a spring force to the end surface 64 of armature shaft 56 in a direction parallel to the longitudinal axis 54 of armature shaft 56 as illustrated by arrow 192. In other words, base 182 absorbs axial loads on the armature shaft in a direction to parallel to longitudinal axis 54. Base 182 therefore provides impact loading for the armature shaft 56 within the pole housing 12 as discussed above. In an illustrated embodiment, bearing 170 is formed from a metal material such as steel.

A PTFE coating is illustratively applied to at least the inner surface 174 of bearing 170. Therefore, as discussed above, oil or grease are not required on the bearing 170. It is understood that other coatings may be used to reduce friction between the bearing 170 and armature shaft 56. In other embodiments, the bearing 170 may be made from a polymeric material such as an ultra high molecular weight polyethylene (UHMWPE) material, for example.

Figure 12:
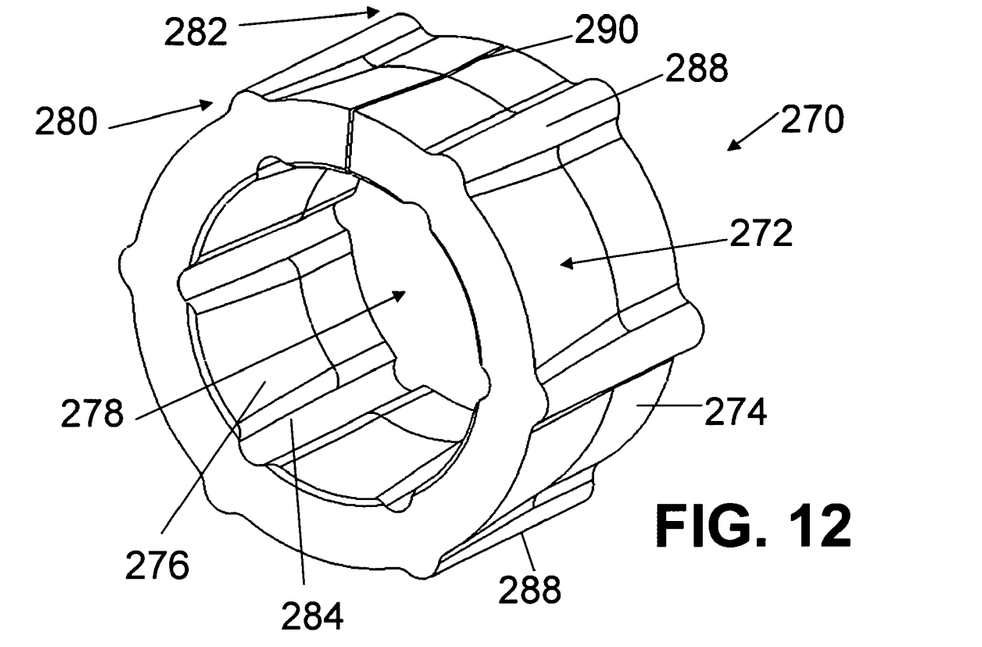
FIG. 12 is a perspective view of a further embodiment of a bearing of the present invention.
Figure 13:
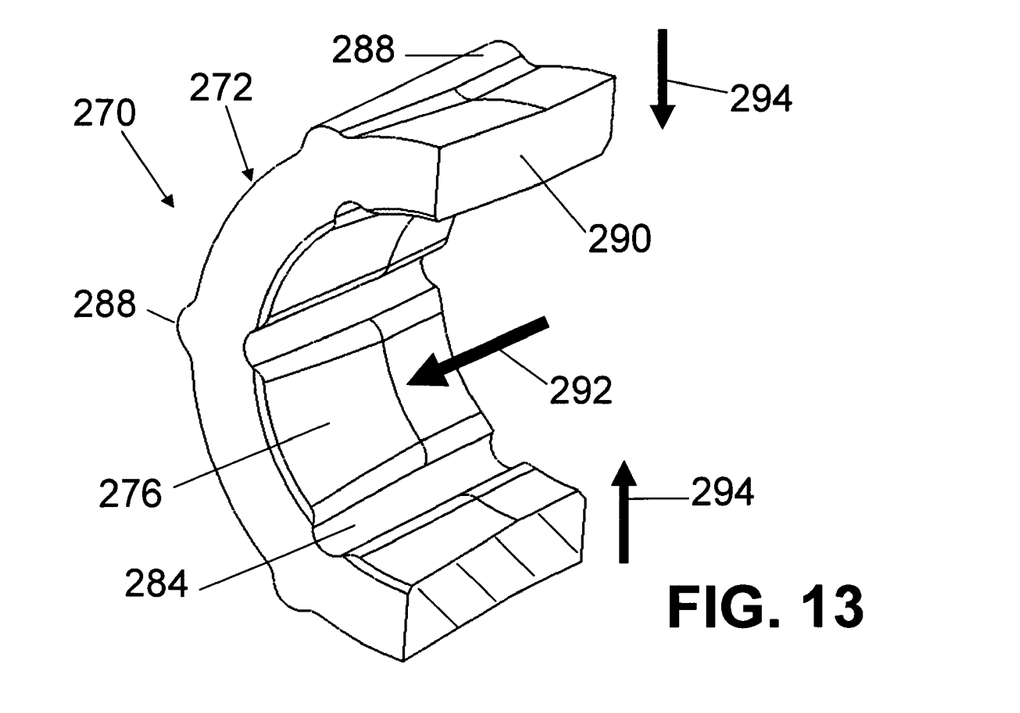
FIG. 13 is a sectional view taken through the bearing of FIG. 12.

Yet another embodiment of the present invention is illustrated in FIGS. 12 and 13. In this embodiment, a bearing 270 includes a generally cylindrical body portion 272. Body portion 272 includes an outer surface 274 and an inner surface 276 configured to engage end 58 of armature shaft 56. In other words, bearing 270 defines an opening 278 for receiving end portion 58 of armature shaft 56.

A leading end 280 of bearing 270 is illustratively inserted first into the nose 16 of pole housing 12. Bearing 270 is tapered radially outwardly between leading end 280 and trailing end 282. In other words, trailing end 282 has a larger diameter than leading end 280. Bearing 270 includes internal grooves 284 formed in inner surface 276 and elevated ribs 288 formed on outer surface 274 of body portion 272. Ribs 288 are also tapered radially outwardly from leading end 280 to trailing end 282 of bearing 270.

In an illustrated embodiment, the body portion 272 of bearing 270 is formed from rolled metal leaving a split or gap 290 illustrated in FIGS. 12 and 13. Therefore, as the bearing 270 is inserted into the nose 16 of pole housing 12 in the direction of arrow 292 of FIG. 13, body portion 272 may be compressed radially inwardly as illustrated by arrows 294 and FIG. 13. Such radial compression of the body portion 272 provides an interference fit to hold the bearing 270 in the nose 16 of pole housing 12. Since the bearing 270 is tapered radially inwardly from trailing end 282 to leading end 280, outer surface 274 provides a ramp surface having an increasing diameter to facilitate insertion of the bearing 270 into the nose 16 of housing 12.

In an illustrated embodiment, bearing 270 is formed from steel having a polymeric coating at least on the inner surface 276. Illustratively, the coating is a PTFE material. It is understood however that other materials may be used for the coating to provide a low friction, self lubricating surface. Therefore, oil and grease to lubricate the bearing is not required. In other embodiments, other materials may be used for the bearing 270 including polymeric material such as ultra high molecular weight polyethylene or other suitable materials. In these embodiments, bearing may be injection molded and formed as a unitary piece without gap 290.

While the invention has been illustrated and described in detail in the drawings and foregoing description, the description is to be considered as illustrative and not restrictive in character. Variations and modifications exist within the scope and spirit of the present invention as described and defined herein and in the following claims.

What is claimed is:

1. An electric motor comprising:
 a housing including a body portion having a nose and an open end opposite from the nose, the open end providing access to an interior region of the housing;
 a magnet structure located in the interior region of the housing;
 an armature located in the interior region of the housing, the armature including an armature shaft having a portion located in the nose of the housing, the armature and armature shaft being rotatable relative to the magnet structure; and
 a bearing located in the nose of the housing, the bearing including:
  a generally cylindrical body portion having a first diameter and an open end configured to receive a portion of the armature shaft, the body portion having an inner surface configured to directly engage the armature shaft and support radial loads on the armature shaft in a direction normal to a longitudinal axis of the armature shaft,
  a base formed as a single structure with the body portion and made of the same material as the body portion, the base being movable relative to the body portion to apply a spring force to an end of the armature shaft in an axial direction generally parallel to the longitudinal axis of the armature shaft, and
  a retaining portion formed as a single structure and made of the same material as the body portion and the base, the retaining portion extending radially outwardly from the body portion beyond the first diameter so that the retaining portion engages an inner surface of the housing to retain the bearing in the nose of the housing.

2. The electric motor of claim 1, wherein the bearing includes a connecting portion located between the body portion and the base, the connecting portion being formed as a single structure and made of the same material as the body portion, the base, and the retaining portion, the connecting portion providing a predetermined spring constant for the spring force applied by the base.

3. The electric motor of claim 2, wherein the connecting portion is curved inwardly at a second end of the bearing opposite from the open end.

4. The electric motor of claim 3, wherein the second end of the bearing includes a plurality of openings to form a web between the body portion and the base.

5. The electric motor of claim 1, further comprising a polymeric material located on the inner surface of the body portion.

6. The electric motor of claim 5, wherein the polymeric material is a PTFE material coating.

7. The electric motor of claim 1, further comprising a plurality of ribs formed on an outer surface of the body portion of the bearing.

8. The electric motor of claim 7, wherein the ribs include a lead-in ramp surface and an elongated body portion extending longitudinally along the outer surface of the body portion of the bearing.

9. The electric motor of claim 1, further comprising a plurality of spring lobes formed on the body portion, the spring lobes being configured to engage the nose of the housing and to apply radially directed spring forces to the armature shaft in a direction normal to a longitudinal axis of the armature shaft.

10. The electric motor of claim 1, wherein the retaining portion includes a flange located adjacent the open end of the body portion, the flange being formed as a single structure and made of the same material as the body portion and the base and having an outer surface configured to engage the inner surface of the housing to hold the bearing in the housing.

11. A bearing for an electric motor, the bearing comprising:
a body portion having an open end configured to receive a portion of an armature shaft of an electric motor therein, the body portion having an inner surface configured to directly engage the armature shaft and support radial loads on the armature shaft in a direction normal to a longitudinal axis of the armature shaft;
a base formed as a single structure and made of the same material as the body portion and movable relative to the body portion to apply a spring force to an end surface of the armature shaft; and
a connecting portion located between the body portion and the base, the connecting portion being formed as a single structure and made of the same material as the body portion and the base, the connecting portion being configured to provide a predetermined spring constant for the spring force applied by the movable base.

12. The bearing of claim 11, wherein the body portion further comprises means for retaining the body portion in a housing of the electric motor, the retaining means being formed as a single structure and made of the same material as the body portion, the base, and the connecting portion, the retaining means extending radially outwardly beyond the body portion so that the retaining means engages an inner surface of a housing of the electric motor to retain the bearing in the housing.

13. The bearing of claim 12, wherein the retaining means includes a plurality of ribs formed on an outer surface of the body portion.

14. The bearing of claim 12, wherein the retaining means includes a plurality of spring lobes formed on the body portion, the spring lobes being configured to engage the housing of the electric motor and to apply radially directed spring forces to the armature shaft.

15. The bearing of claim 11, wherein the connecting portion includes a plurality of openings to form a web between the body portion and the base.

16. The bearing of claim 11, further comprising a polymeric material located on the inner surface of the body portion.

17. The bearing of claim 16, wherein the polymeric material is a PTFE material coating.

18. The bearing of claim 11, wherein the body portion, base and connecting portion form a cup-shaped bearing that surrounds an end of the armature shaft.

19. The bearing of claim 11, further comprising a flange located adjacent the open end of the body portion, the flange being formed as a single structure and made of the same material as the body portion, the base and the connecting portion, the flange having an outer surface configured to engage an inner surface of a housing of an electric motor to hold the bearing in the housing.

20. A bearing for an electric motor, the bearing comprising:
a body portion having an open end configured to receive a portion of an armature shaft of an electric motor therein, the body portion having an inner surface configured to directly engage the armature shaft and being configured to support radial loads on the armature shaft in a direction normal to a longitudinal axis of the armature shaft; and
means formed as a single structure and made of the same material as the body portion for applying a force to the armature shaft in an axial direction generally parallel to the longitudinal axis of the armature shaft.

21. The bearing of claim 20, further comprising means for retaining the bearing within the nose of the housing, the retaining means being formed as a single structure and made of the same material as the body portion and the means for applying a force to the armature shaft, the retaining means extending radially outwardly beyond the body portion so that the retaining means engages an inner surface of a housing of the electric motor to retain the bearing in the housing.

22. The bearing of claim 20, further comprising a polymeric material coating located on the inner surface of the body portion.

23. The bearing of claim 22, wherein the polymeric material coating is a PTFE material.

24. The bearing of claim 20, further comprising a flange located adjacent the open end of the body portion, the flange being formed as a single structure and made of the same material as the body portion and the means for applying a force to the armature shaft, and the flange having an outer surface configured to extend radially outwardly beyond the body portion to engage an inner surface of a housing of the electric motor to hold the bearing in the housing.

25. A bearing for an electric motor, the bearing comprising:
a generally cylindrical body portion configured to receive and surround a portion of an armature shaft of an electric motor, the body portion having an inner surface and an outer surface defining a first diameter, the inner surface being configured to directly engage the armature shaft to support radial loads on the armature shaft in a direction normal to a longitudinal axis of the armature shaft; and
means formed as a single structure and made of the same material as the body portion for retaining the body portion in a housing of the electric motor, the retaining means extending radially outwardly beyond the first diameter of the body portion so that the retaining means engages an inner surface of the housing to retain the body portion in the housing.

26. The bearing of claim 25, wherein the retaining means comprises a plurality of ribs extending radially outwardly from the outer surface of the body portion to engage an inner surface of the housing of the electric motor to retain the body portion in the housing.

27. The bearing of claim 26, further comprising a plurality of longitudinally extending grooves formed in the inner surface of the body portion.

28. The bearing of claim 25, wherein the retaining means comprises a plurality of spring lobes extending radially outwardly from the body portion to engage an inner surface of the housing of the electric motor to retain the body portion in the housing.

29. The bearing of claim 25, wherein the body portion is tapered radially outwardly from a leading end of the body portion to a trailing end of the body portion.

30. The bearing of claim 29, wherein the body portion is split so that the body portion is compressed radially inwardly upon insertion of the body portion into a housing to provide an interference fit between the body portion and the housing.

31. The bearing of claim 25, wherein the body portion and the retaining means are formed from a metal material, and further comprising a PTFE coating formed on at least the inner surface of the body portion.

32. The bearing of claim 25, further comprising a base formed as a single structure and made of the same material as the body portion and the retaining means, the base being configured to apply a spring force to an end surface of the armature shaft, and a connecting portion located between the body portion and the base, the connecting portion being formed as a single structure and made of the same material as the body portion, the retaining means, and the base, the connecting portion being configured to provide a predetermined spring constant for the spring force applied by the base.

33. The bearing of claim 25, wherein the retaining means comprises a flange located adjacent an open end of the body portion, the flange being formed as a single structure and made of the same material as the body portion and having an outer surface configured to engage the inner surface of the housing of the electric motor to hold the bearing in the housing.

34. The electric motor of claim 1, wherein the body portion of the bearing has a closed end portion opposite the open end, the closed end portion of the bearing including a recessed section configured to define the base, the closed end portion and the recessed section being configured to establish a pre-determined spring constant for the spring force applied by the base.

35. The electric motor of claim 11, wherein the body portion of the bearing has a closed end portion opposite the open end, the closed end portion of the bearing including a recessed section configured to define the base, the closed end portion and the recessed section being configured to establish the pre-determined spring constant for the spring force applied by the base.

36. The electric motor of claim 32, wherein the body portion of the bearing has a closed end portion opposite an open end configured to receive the portion of the armature shaft of the electric motor, the closed end portion of the bearing including a recessed section configured to define the base, the closed end portion and the recessed section being configured to establish the pre-determined spring constant for the spring force applied by the base.

* * * * *